United States Patent
Ma et al.

(10) Patent No.: US 12,533,807 B2
(45) Date of Patent: Jan. 27, 2026

(54) ROBOTIC APPARATUS AND CONTROL METHOD THEREOF

(71) Applicant: CORNERSTONE TECHNOLOGY (SHENZHEN) LIMITED, Guangdong (CN)

(72) Inventors: Carlos Ma, Guangdong (CN); Yueqiang Lu, Guangdong (CN)

(73) Assignee: CORNERSTONE TECHNOLOGY (SHENZHEN) LIMITED, Shenzhen (CN)

( * ) Notice: Subject to any disclaimer, the term of this patent is extended or adjusted under 35 U.S.C. 154(b) by 243 days.

(21) Appl. No.: 18/350,743

(22) Filed: Jul. 11, 2023

(65) Prior Publication Data

US 2023/0347517 A1    Nov. 2, 2023

Related U.S. Application Data

(63) Continuation of application No. PCT/CN2021/129098, filed on Nov. 5, 2021.

(30) Foreign Application Priority Data

Jan. 12, 2021 (CN) .................. 202110035516.X

(51) Int. Cl.
*B25J 9/16* (2006.01)
*A61B 34/30* (2016.01)

(52) U.S. Cl.
CPC .......... *B25J 9/1664* (2013.01); *A61B 34/30* (2016.02)

(58) Field of Classification Search
CPC ...... B25J 9/1664; B25J 9/1602; B25J 9/1633; B25J 9/1628; A61B 34/30; G05B 2219/32287; G05B 2219/45117

(Continued)

(56) References Cited

U.S. PATENT DOCUMENTS

2006/0058919 A1* 3/2006 Sommer .............. A61B 6/0487
                                                                700/245
2013/0245825 A1* 9/2013 Vicentini ............... B25J 9/1674
                                                                901/9

(Continued)

FOREIGN PATENT DOCUMENTS

CN       104764451 A      7/2015
CN       104772756 A      7/2015

(Continued)

OTHER PUBLICATIONS

Shirazi, A.R., M.M.S. Fakhrabadi, and A. Ghanbari. 2012. Optimal Design of a 6-DOF Parallel Manipulator Using Particle Swarm Optimization. Advanced Robotics 26 (13): 1419-1441. doi:10.1080/01691864.2012.690187. (Year: 2012).*

(Continued)

*Primary Examiner* — Wade Miles
*Assistant Examiner* — Sidney Leigh Molnar
(74) *Attorney, Agent, or Firm* — ScienBiziP, P.C.

(57) ABSTRACT

The present disclosure provides robot apparatus and a control method thereof. The robotic apparatus includes an executing device and a driving device. The method includes: acquiring inertial sensing data from at least one inertial sensor disposed on one or both of the executing device and the driving device; performing data fusion on at least the inertial sensing data to obtain fused data of the robotic apparatus; and determining an operation status of the robotic apparatus based on the fused data, and controlling the robotic apparatus in response to the operation status. In the present disclosure, inertial sensing data is detected by inertial sensor and data fusion and analysis are performed.

20 Claims, 3 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 2016/0129595 | A1* | 5/2016 | Gerio | B25J 13/088 901/14 |
| 2018/0168749 | A1* | 6/2018 | Dozeman | A61B 34/30 |
| 2019/0200844 | A1* | 7/2019 | Shelton, IV | H04L 67/10 |
| 2020/0001459 | A1* | 1/2020 | Song | B25J 9/1682 |
| 2023/0028689 | A1* | 1/2023 | Rabindran | B25J 9/1697 |
| 2023/0114137 | A1* | 4/2023 | Wu | A61B 90/57 |
| 2023/0320798 | A1* | 10/2023 | Blake | A61B 34/37 606/1 |

FOREIGN PATENT DOCUMENTS

| | | | | |
|---|---|---|---|---|
| CN | 106383521 | A | | 2/2017 |
| CN | 108132053 | A | | 6/2018 |
| CN | 109069209 | A | | 12/2018 |
| CN | 110076776 | A | | 8/2019 |
| CN | 112043380 | A | | 12/2020 |
| CN | 112720503 | A | | 4/2021 |
| CN | 116792493 | A | * | 9/2023 .............. A61B 90/06 |
| JP | 2000271888 | A | | 10/2000 |
| JP | 2012020343 | A | | 2/2012 |
| WO | WO-2014104086 | A1 | * | 7/2014 .............. A61B 34/30 |
| WO | 2019094794 | A2 | | 5/2019 |

OTHER PUBLICATIONS

Unknown Inventor, Translation of CN116792493, Application filed Jun. 26, 2023, Published on Sep. 22, 2023, Translation acquired from Patent Translate via Espacenet. (Year: 2023).*

Song, Translation of WO2014104086A1, Application filed on Dec. 25, 2013, Published on Jul. 3, 2014, Translation acquired from Patent Translate via Espacenet. (Year: 2014).*
Jung, Won-Jo, Kyung-Soo Kwak, and Soo-Chul Lim. "Vision-based suture tensile force estimation in robotic surgery." Sensors 21.1 (2020): 110. (Year: 2020).*
Shao, Ziyan, et al. "Force and deformation transmission characteristics of a compliant tendon-sheath actuation system based on Hill-type muscle model." Proceedings of the Institution of Mechanical Engineers, Part H: Journal of Engineering in Medicine 233.7 (2019): 695-705. (Year: 2019).*
Lukas Stadelmann, et al, "End-Effector Pose Correction for Versatile Large-Scale Multi-Robotic Systems", IEEE Robotics and Automation Letters, IEEE, vol. 4, No. 2, Apr. 1, 2019, 8 pgs.
Sukhan Lee, et al, "Intelligent Sensing and Control for Advanced Teleoperation", Proceedings of the International Symposium on Intelligent Control. Glasgow, Aug. 11-13, 1992, [Proceedings of the International Symposium on Intelligent Control], New York, IEEE, US, Aug. 11, 1992, 11 pgs.
Andry M. Pinto, et al, A Localization Method Based on Map-Matching and Particle Swarm Optimization, Journal of Intelligent, Springer Netherlands, Dordrecht, vol. 77, No. 2, Dec. 21, 2013, 14 pgs.
Cornerstone Technology (Shenzhen) Limited, Extended European Search Report, EP 21919007.1, May 3, 2024, 8 pgs.
Cornerstone Technology (Shenzhen) Limited, International Search Report with English translation, PCT/CN2021/129098, Feb. 10, 2022, 6 pgs.
Cornerstone Technology (Shenzhen) Limited, CN First Office Action with English translation, CN 202110035516X, Nov. 29, 2021, 17 pgs.
Cornerstone Technology (Shenzhen) Limited, CN Second Office Action with English translation, CN 202110035516X, Mar. 23, 2022, 16 pgs.
Xuexiang Yu, et al., "GPS Survey and Data Process", China University of Mining and Technology Press, Oct. 31, 2013, 11 pgs.
Cornerstone Technology (Shenzhen) Limited, EP Article A94(3), EP 21919007.1, Dec. 20, 2024, 16 pgs.

* cited by examiner

ROBOTIC APPARATUS AND CONTROL METHOD THEREOF

CROSS REFERENCE TO RELATED APPLICATIONS

The present application is a continuation of PCT application No. PCT/CN2021/129098, entitled "ROBOTIC APPARATUS AND CONTROL METHOD THEREFOR," filed on Nov. 5, 2021, which claims priority to Chinese patent application No. 202110035516.X, filed on Jan. 12, 2021, each of which is incorporated by reference herein in its entirety.

TECHNICAL FIELD

The present disclosure relates to the field of robots, and in particular to a robotic apparatus and a control method thereof.

BACKGROUND

With development of the robot technology, the robotic apparatuses are increasingly widely used in various fields, for example, the medical field. Traditional medical robotic apparatus may manipulate an executing instrument, such as a surgical instrument, with a robotic arm adopting a parallel mechanism (PLM), such that the surgical instrument is moved and constrained at a fixed remote center of motion (RCM). Moreover, a plurality of encoders (ENC) installed at the parallel mechanism are used to measure the angle synchronization between insertion arm (ISA) for holding the surgical instrument and the compact motor drive (CMD) for driving the parallel mechanism. However, the encoder system can only achieve measurement of pitch angle synchronization between the compact motor drive and the insertion arm, but cannot measure the displacement of the parallel mechanism in other directions. Moreover, the encoder system may result in increased number of circuit module devices in the parallel mechanism, which reduces the reliability of the robotic apparatus and increases wiring complexity, and thus increases the complexity of structural design and affects the structural optimization design of the robotic apparatus.

SUMMARY

Embodiments of the present disclosure provide robotic apparatus and a control method thereof, and a system and a computer storage medium, in order to at least address one of the above-mentioned problems that deformation in other directions of the parallel mechanism cannot be measured, the structure is complex, and reliability of the robotic apparatus is low.

A first aspect of the present disclosure provides a method for controlling a robotic apparatus. The robotic apparatus includes an executing device on which an executing instrument is mounted and a driving device configured to drive the executing device to move on the driving device. The method includes:
  acquiring inertial sensing data from at least one inertial sensor disposed on one or both of the executing device and the driving device;
  performing data fusion on at least the inertial sensing data to obtain fused data of the robotic apparatus; and
  determining an operation status of the robotic apparatus based on the fused data, and controlling the robotic apparatus in response to the operation status.

In some embodiments, performing the data fusion on at least the inertial sensing data, includes:
  calculating one or more of an actual pitching angle, an actual rolling angle and an actual yawing angle of the driving device based on at least the inertial sensing data.

Determining the operation status of the robotic apparatus based on the fused data, and controlling the robotic apparatus in response to the operation status, includes:
  determining whether one or more of the actual pitching angle, the actual rolling angle and the actual yawing angle are synchronized with one or more respective target angles;
  in response to one or more of the actual pitching angle, the actual rolling angle and the actual yawing angle being not synchronized with the one or more respective target angles, determining that the robotic apparatus is working abnormally; and
  in response to the robotic apparatus being working abnormally, controlling the robotic apparatus to stop working.

In some embodiments, determining whether one or more of the actual pitching angle, the actual rolling angle and the actual yawing angle are synchronized with the one or more respective target angles, includes:
  determining whether each of the actual pitching angle, the actual rolling angle or the actual yawing angle falls within a respective preset angle range, where the respective preset angle range includes a respective target angle of the one or more respective target angles; and
  in response to one or more of the actual pitching angle, the actual rolling angle and the actual yawing angle not falling within the respective preset angle range, determining that the actual pitching angle, the actual rolling angle or the actual yawing angle is not synchronized with the one or more respective target angles.

In some embodiments, determining the operation status of the robotic apparatus based on the fused data, and controlling the robotic apparatus in response to the operation status, further includes:
  calculating one or more respective synchronization rates for one or more of the actual pitching angle, the actual rolling angle and the actual yawing angle based on one or more of the actual pitching angle, the actual rolling angle and the actual yawing angle and the one or more respective target angles;
  determining whether each synchronization rate of the one or more respective synchronization rates for one or more of the actual pitching angle, the actual rolling angle and the actual yawing angle is greater than or equal to a respective synchronization rate threshold; and
  in response to at least one synchronization rate of the one or more respective synchronization rates for one or more of the actual pitching angle, the actual rolling angle and the actual yawing angle being less than one or more respective synchronization rate thresholds, determining that the robotic apparatus is working abnormally and controlling the robotic apparatus to stop working.

In some embodiments, determining the operation status of the robotic apparatus based on the fused data, and controlling the robotic apparatus in response to the operation status, further includes:
  calculating, based on the one or more respective synchronization rates for one or more of the actual pitching angle, the actual rolling angle and the actual yawing angle, one or more respective changes in the one or more respective synchronization rates for one or more of the actual pitching angle, the actual rolling angle and the actual yawing angle within a first preset time period, and determining whether the one or more respective changes exceed one or more corresponding change thresholds; and
  in response to the one or more respective changes within the first preset time period exceeding the one or more corresponding change thresholds, determining that the robotic apparatus is working abnormally and controlling the robotic apparatus to stop working.

In some embodiments, the robotic apparatus further includes a transmission device connected to the driving device and configured to move the driving device.

Performing the data fusion on at least the inertial sensing data to obtain the fused data of the robotic apparatus, includes:
  calculating an output angle of the transmission device based on the inertial sensing data;
  calculating, each time, a respective difference between the output angle of the transmission device and an input angle of the transmission device; and
  estimating a permanent consumption of the transmission device based on a mathematical kinematic model for the transmission device and one or both of a change and a rate of change in neighboring differences.

Determining the operation status of the robotic apparatus based on the fused data, includes:
  determining, based on the permanent consumption, whether the robotic apparatus is working normally, and determining remaining usage time or a remaining usage number of times of the transmission device.

In some embodiments, the robotic apparatus further includes a transmission device connected to the driving device and configured to move the driving device, and a force providing device connected to the transmission device and configured to provide a driving force to the transmission device, and the inertial sensing data includes acceleration data.

Performing the data fusion on at least the inertial sensing data, includes:
  acquiring actual current data of the force providing device; and
  estimating theoretical acceleration data of the transmission device based on the actual current data and a mathematical kinematic model for the transmission device.

Determining the operation status of the robotic apparatus based on the fused data, and controlling the robotic apparatus in response to the operation status, includes:
  determining whether a collision occurs on the robotic apparatus based on the theoretical acceleration data and the acceleration data; and
  in response to determining that a collision occurs on the robotic apparatus, controlling the robotic apparatus to stop working.

In some embodiments, the robotic apparatus further includes: a transmission device connected to the driving device and configured to move the driving device, a force providing device connected to the transmission device and configured to provide a driving force to the transmission device, and an adjusting device connected to the force providing device and configured to adjust an angle of the force providing device.

Performing the data fusion on at least the inertial sensing data, includes:
  calculating deformation data of the transmission device based on the inertial sensing data; and
  calculating magnitude and a direction of force applied by a user on the driving device based on the deformation data.

Determining the operation status of the robotic apparatus based on the fused data, and controlling the robotic apparatus in response to the operation status, includes:
  controlling at least one angle of the adjusting device based on the magnitude and the direction of the force.

In some embodiments, performing the data fusion on at least the inertial sensing data to obtain the fused data of the robotic apparatus, includes:
  acquiring control signals of the robotic apparatus; and
  fusing the inertial sensing data and the control signals to obtain the fused data.

In some embodiments, the method further includes: using a complementary algorithm, an algorithm based on noise models, or an algorithm based on particle swarm optimization to perform the data fusion on at least the inertial sensing data to obtain the fused data of the robotic apparatus.

In some embodiments, the inertial sensing data includes one or more of acceleration data, angular velocity data, and direction data.

A second aspect of the present disclosure provides a robotic apparatus, including:
  an executing device, on which an executing instrument is mounted;
  a driving device, connected to the executing device and configured to drive the executing device to move on the driving device;
  at least one processor; and
  a memory being in communication connection with the at least one processor.

The memory is configured to store instructions, which, when executed by the at least one processor, causes the at least one process to implement operations of the method for controlling the robotic apparatus as illustrated above. The method includes:
  acquiring inertial sensing data from at least one inertial sensor disposed on one or both of the executing device and the driving device;
  performing data fusion on at least the inertial sensing data to obtain fused data of the robotic apparatus; and
  determining an operation status of the robotic apparatus based on the fused data, and controlling the robotic apparatus in response to the operation status.

In some embodiments, the at least one inertial sensor includes two or more of a gyroscope, an accelerometer and a magnetometer.

The robotic apparatus and control method thereof according to embodiments of the present disclosure use at least one inertial sensor to detect inertial sensing data and perform data fusion and analysis. In this way, precision of the detection performed on the robotic apparatus can be improved, thereby improving the reliability of the robotic apparatus. Moreover, a plurality of sets of encoders can be eliminated, thereby greatly simplifying the structure of the robotic apparatus, reducing weight and volume of the robotic apparatus, and reducing costs.

BRIEF DESCRIPTION OF THE DRAWINGS

By providing more detailed description of the embodiments of the present disclosure with reference to the accompanying drawings, the above and other purposes, features, and advantages of the present disclosure will become more apparent. The accompanying drawings are used to provide a further understanding of the embodiments of the present disclosure and form a part of the specification. The accompanying drawings, together with the embodiments of the present disclosure, are used to illustrate the present disclosure and do not constitute a limitation of the present disclosure. In the accompanying drawings, the same reference numerals usually represent the same components or operations.

DETAILED DESCRIPTION OF THE EMBODIMENTS

In order to make the purpose, technical solution, and advantages of the present disclosure more apparent, the following will refer to the accompanying drawings to describe in detail the exemplary embodiments according to the present disclosure. Obviously, the described embodiments are only a portion of the embodiments of the present disclosure, not all of them. It should be understood that the present disclosure is not limited by the exemplary embodiments described herein. Based on the embodiments described in the present disclosure, all other embodiments obtained by those skilled in the art without creative works shall fall within the scope of protection of the present disclosure.

Traditional robotic apparatus used in the medical field, such as surgical robots, has a parallel mechanism including one or more pre-tensioned metal strips or steel belts (PSB) for transmitting driving force, and uses a plurality of encoder modules installed at the parallel mechanism to measure the angle synchronization between the insertion arm for a surgical instrument and the compact motor drive, as well as the elongation of the metal strips and the displacements of the parallel mechanism, thereby implementing safety detection of a structural state. However, the encoder modules are unable to measure the displacements of the parallel mechanism in other directions and proactively detect collisions occurred on the robotic arm from external environment. Moreover, using encoder modules will result in increased number of module devices in the parallel mechanism, reduced reliability of the robotic apparatus and increased wiring complexity, thereby increasing the complexity of structural design and affecting structural optimization design.

Figure 1:
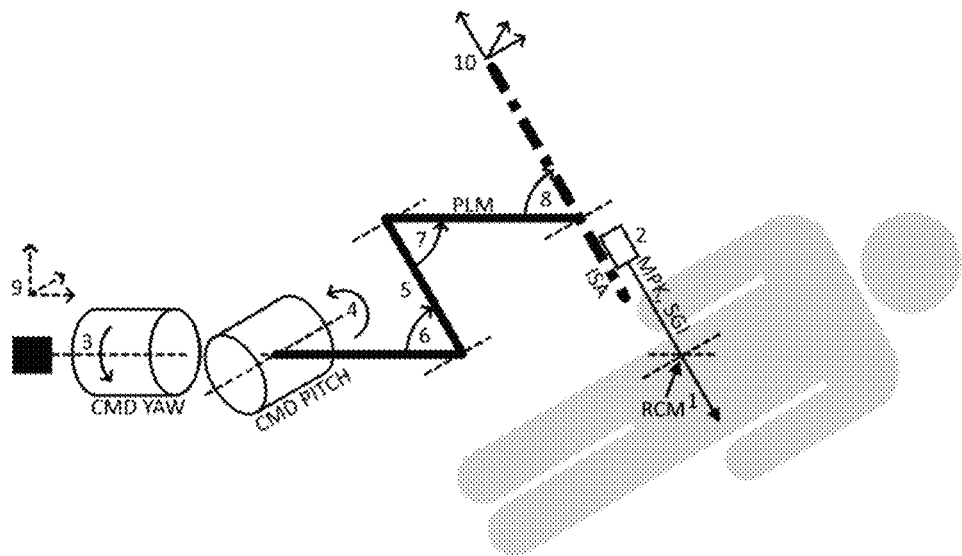
FIG. 1 is a schematic diagram of the robotic apparatus.

Referring to FIG. 1, FIG. 1 shows a schematic diagram of the robotic apparatus. As shown in FIG. 1, a traditional surgical robot employs a remote center of motion 1 for each robotic arm to operate on a target object through a respective one of several small holes and improve the safety of the surgery. The yawing and pitching movements of the surgical instrument (SGI) 2 disposed at the front end of the robotic apparatus are achieved by the driving force provided by the compact motor drives 3 and 4 disposed at the rear end of the robot. For example, the compact motor drives 3 and 4 transmit the driving force to the insertion arm 10 for the surgical instrument through the parallel mechanism 5 and pre-tensioned metal strips installed inside the parallel mechanism 5. Moreover, the insertion arm 10 for the surgical instrument provides the translational motion of the surgical instrument 2 along a central axis, thereby achieving control of the surgical instrument of multiple degree of freedom.

Figure 2:
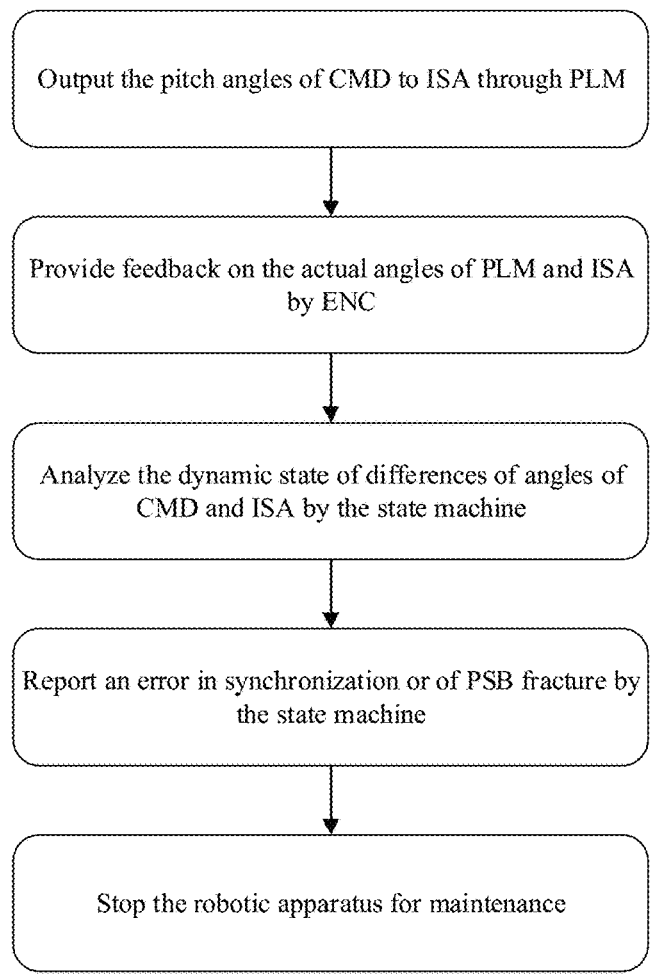
FIG. 2 is a schematic flowchart of synchronization detection of pitch angles for the robotic apparatus.

The reliability of transmission of driving force of the robotic apparatus as shown in FIG. 1 depends on the structural integrity of the parallel mechanism 5 and the pre-tensioning force of the pre-tensioned metal strips. Traditional robotic apparatus uses a plurality of encoder modules 6, 7, 8 installed in the parallel mechanism 5 to measure the changes in relationship between output angles and input angles of each link of the parallel mechanism 5 in real-time, in order to determine the integrity of the parallel mechanism 5 and the pre-tensioning degree of the pre-tensioned metal strips. Referring to FIG. 2, FIG. 2 shows a schematic flowchart of synchronization detection of pitch angles for the robotic apparatus. As shown in FIG. 2, the pitch angles output by compact motor drive 4 are output to the insertion arm 10 for surgical instrument through the parallel mechanism 5 and the pre-tensioned metal strips installed inside the parallel mechanism 5. The encoder modules 6, 7, 8 provide feedback on the actual pitch angles of PLM and ISA. After processing the actual pitch angles and the pitch angles output by the compact motor drive 4, the system state machine makes a judgment on whether an error in synchronization of pitch angles occurs or the pre-tensioned metal strips in the parallel mechanism 5 fracture. Based on this, the controller may interrupt the surgery and issue an alarm prompt for maintenance of the robotic apparatus.

It can be seen that as shown in FIGS. 1 and 2, the coordination of the plurality of encoder modules 6, 7, 8 installed in the parallel mechanism 5 will increase the circuit design requirements, installation of sensors, and mechanical coordination of the safety detection system in the parallel mechanism. Thus, the entire system has a complex design, reduced reliability, reduced design degree of freedom of the parallel mechanism, and increased weight of the product. Moreover, the system of encoder modules cannot detect synchronization abnormalities of yawing angles.

Figure 3:
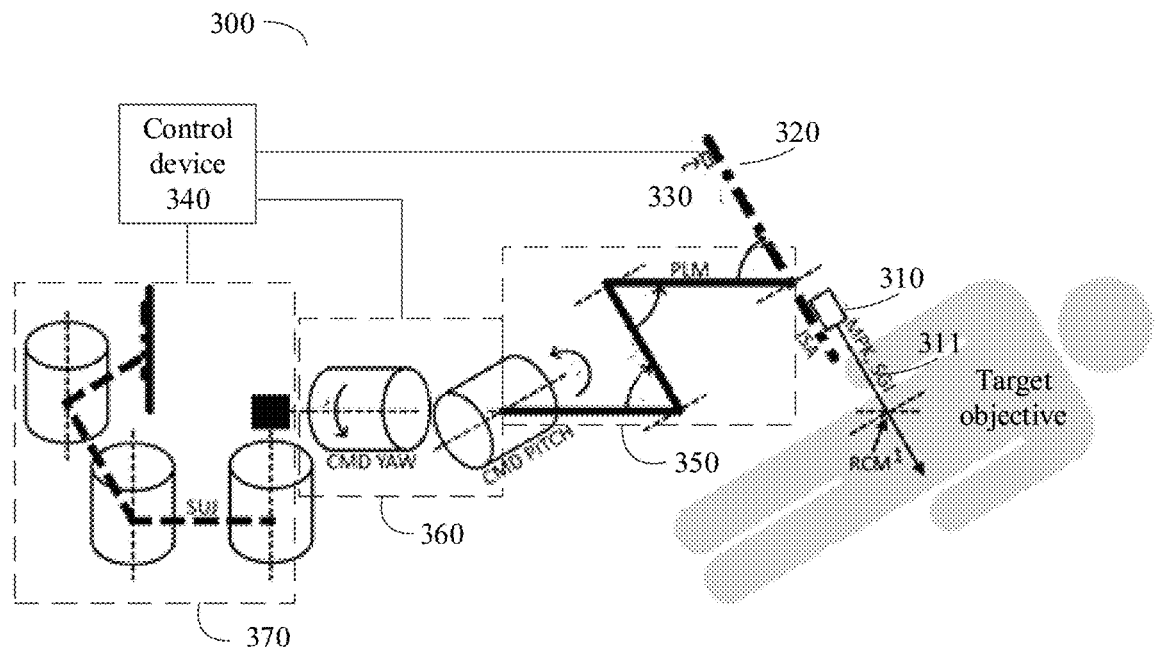
FIG. 3 is a schematic diagram of the robotic apparatus according to some embodiments of the present disclosure.

In view of the above, a robotic apparatus and a control method thereof according to embodiments of the present disclosure are proposed. Referring to FIG. 3, FIG. 3 shows a schematic diagram of the robotic apparatus according to some embodiments of the present disclosure. As shown in FIG. 3, the robotic apparatus 300 may include:

an executing device 310, on which an executing instrument 311 is mounted;

a driving device 320, connected to the executing device 310 and configured to drive the executing device 310;

at least one inertial sensor 330, disposed on one or both of the executing device 310 and the driving device 320 and configured to detect motion of the driving device 320 to generate inertial sensing data; and a control device 340, connected to the at least one inertial sensor 330 and configured to perform at least a part of or all operations of the method for controlling the robotic apparatus according to the embodiments of the present disclosure.

In some embodiments, the executing instrument 311 may be a surgical instrument. In some embodiments, a surgical instrument may be an instrument that performs surgical operations (such as grasping, shearing, cutting, clamping, sewing, etc.) on a target object, such as surgical forceps, surgical scissors, high-frequency electric knives, suture needles or the like. In some embodiments, the surgical instrument may also be an instrument that assist in performing surgical operations, such as various types of image acquisition devices, endoscopes or the like. It should be understood that the surgical instruments are not limited to the above-listed examples, but may be any instruments related to performing surgery, and will not be exhaustively described herein.

In some embodiments, the executing device 310 may include a motor pack (MPK) for a surgical instrument and configured to drive the surgical instrument fixed on the executing device to perform various surgical operations In some embodiments, the driving device 320 may include an insertion arm for the surgical instrument.

In some embodiments, the inertial sensor 330 includes two or more of a gyroscope, an accelerometer, and a magnetometer. In some embodiments, two types of the inertial sensor 330 may be employed, for example: a gyroscope and an accelerometer, a gyroscope and a magnetometer. Alternatively, more than two types of the inertial sensor 330 may be employed, for example: a gyroscope, an accelerometer, and a magnetometer.

In some embodiments, the control device 340 may be implemented by software, hardware, firmware, or a combination thereof. In some embodiments, the control device 340 may use circuits, which may include one or more of an application specific integrated circuit (ASIC), a digital signal processor (DSP), a digital signal processing device (DSPD), a programmable logic device (PLD), a field programmable gate array (FPGA), a central processing unit (CPU), a PLC, a microcontroller, and a microprocessor.

In some embodiments, the control device 340 may include at least one processor and a memory being in communication connection with the at least one processor. The memory is configured to store instructions, which, when executed by the at least one processor, causes the at least one process to perform at least a part of or all operations of the method for controlling the robotic apparatus according to the embodiments of the present disclosure.

The memory and the at least one processor are connected via a bus. The bus may include any number of interconnected buses and bridges. The bus connects various circuits of the at least one processors and the memory together. The bus may also connect other various circuits such as peripheral devices, voltage regulators, power management circuits and the like together, which is well known in the art. The at least one processor is in charge of managing the buses and routine procedures and further providing various functions such as timing, peripheral interfaces, voltage regulation, power source management and other control functions. The memory is configured to store data used by the at least one processor to perform operations. The memory may include U disks, removable hard disks, Read Only Memory (ROM), Random Access Memory (RAM), magnetic diskette, compact disks or other storage mediums capable of storing program codes.

In some embodiments, the robotic apparatus further includes:
- a transmission device 350, connected to the driving device 320 and configured to move the driving device 320;
- a force providing device 360, connected to the transmission device 350 and configured to provide a driving force to the transmission device 350; and
- an adjusting device 370, connected to the force providing device 360 and configured to adjust one or both of a position and an orientation of the transmission device 350, and one or both of a position and an orientation of the force providing device 360.

In some embodiments, the transmission device 350 may include a parallel mechanism.

In some embodiments, the force providing device 360 may include one or more motors, for example, a compact motor drive. In some embodiments, the control device 340 may control the output angles of the force providing device 360.

Figure 4:
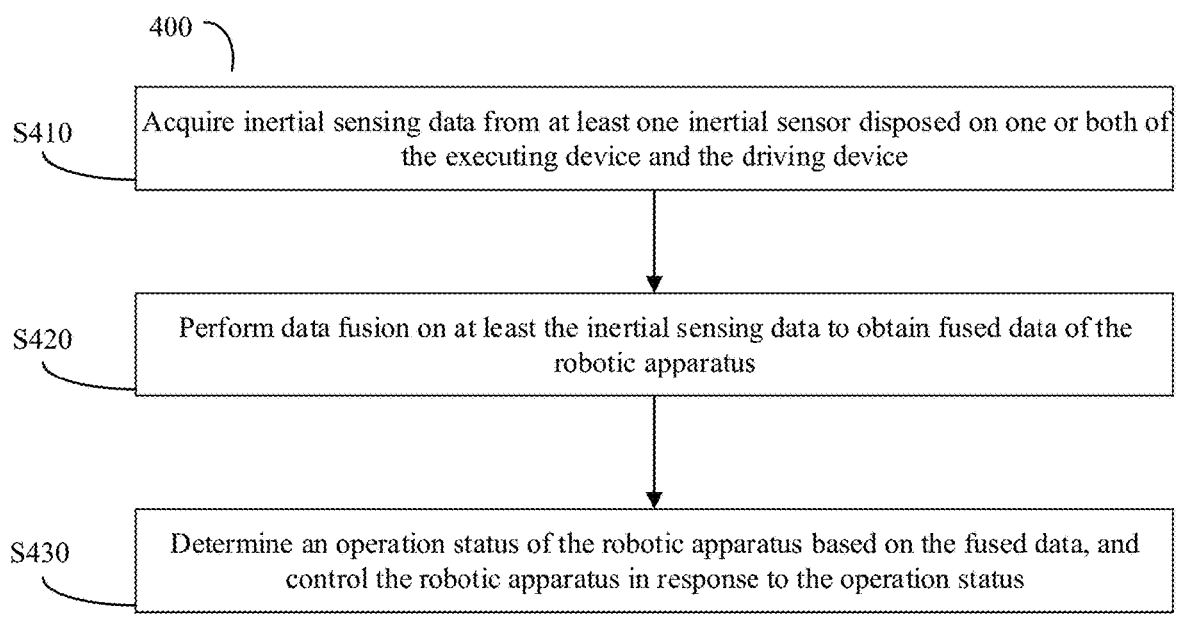
FIG. 4 is a schematic flowchart of the method for controlling the robotic apparatus according to some embodiments of the present disclosure.

In some embodiments, the adjusting device 370 may include a set-up joint (SUJ) disposed at a rear end of the robotic apparatus. As shown in FIG. 3, the robotic apparatus may be a surgical robot, and the transmission device 350 together with the force providing device 360 may serve as a robotic arm of the surgical robot. The set-up joint is disposed at the rear end of the robotic arm and connected to the robotic arm. The set-up joint can conduct one or more of operations of moving the robotic arm horizontally, moving the robotic arm vertically, and adjusting the orientation of the robotic arm, in order to adjust the robotic arm to be in the suitable orientation and position, thereby ensuring that the area of the target object on which surgical operations are performed is within the range of motion of the executing device 310, so that the distance between the robotic arm and the target object is suitable for surgical operations on the target object. Referring to FIG. 4, FIG. 4 shows a schematic flowchart of the method for controlling the robotic apparatus according to some embodiments of the present disclosure. As shown in FIG. 4, the method may be performed by the robotic apparatus, and the method 400 for controlling the robotic apparatus includes:

At S410, inertial sensing data is acquired from at least one inertial sensor disposed on one or both of the executing device and the driving device;

At S420, data fusion is performed on at least the inertial sensing data to obtain fused data of the robotic apparatus; and At S430, an operation status of the robotic apparatus is determined based on the fused data, and the robotic apparatus is controlled in response to the operation status.

By using at least one inertial sensor disposed on one or both of the executing device and the driving device to acquire inertial sensing data and performing data fusion and analysis, precision of the detection performed on the robotic apparatus can be improved, the operation status of the robotic apparatus can be accurately analyzed, and corresponding control can be conducted. In this way, the reliability of the robotic apparatus can be improved. Compared with the traditional robotic apparatus, a plurality of sets of encoders can be eliminated, thereby greatly simplifying the structure of the robotic apparatus, reducing weight and volume of the robotic apparatus, and reducing costs.

In some embodiments, the inertial sensing data includes one or more of acceleration data, angular velocity data, and earth magnetic field direction data. In some embodiments, the acceleration data may be collected through detection by an accelerometer. In some embodiments, the angular velocity data may be collected through detection by a gyroscope. In some embodiments, the earth magnetic field direction data is collected through detection by a magnetometer. In some embodiments, the accelerometer, the gyroscope, or the magnetometer each sends collected respective inertial sensing data to the control device, and the control device performs data fusion calculations to obtain the fused data.

In some other embodiments, a complementary algorithm, an algorithm based on noise models, or an algorithm based on particle swarm optimization is used to perform the data fusion on at least the inertial sensing data.

The algorithms for the data fusion are used to fuse data based on optimized utilization of the inertial sensing data and control signals, including but not limited to inertial sensing data (such as acceleration data, angular velocity data, or direction data), output of the driving devices (such as torque output of a driver), input current of the force providing device (such as motor detection current), etc., to generate optimized deformation amount signals of the transmission device. In comparison, the complementary algorithm has the lowest computation complexity and average fusion performance. The algorithm based on noise models has slightly higher computation complexity and excellent fusion performance. The algorithm based on particle swarm optimization has the highest computation complexity and the best data fusion performance.

In some other embodiments, the operation S420 of performing the data fusion on at least the inertial sensing data, includes:
    calculating one or more of an actual pitching angle, an actual rolling angle and an actual yawing angle of the driving device based on at least the inertial sensing data.

The operation S430 of determining the operation status of the robotic apparatus based on the fused data, and controlling the robotic apparatus in response to the operation status, includes:
    determining whether one or more of the actual pitching angle, the actual rolling angle and the actual yawing angle are synchronized with one or more respective target angles;
    in response to one or more of the actual pitching angle, the actual rolling angle and the actual yawing angle being not synchronized with the one or more respective target angles, determining that the robotic apparatus is working abnormally; and
    in response to the robotic apparatus being working abnormally, controlling the robotic apparatus to stop working.

By determining whether one or more of the actual pitching angle, the actual rolling angle and the actual yawing angle of the driving device are synchronized with a respective target angle, it can be determined whether the robotic apparatus is working abnormally. For example, referring to FIG. 3, in a surgical robot, the executing instrument 311 may be a surgical instrument, the executing device 310 may include a motor pack for a surgical instrument, the driving device 320 may include an insertion arm for surgical instrument, and the motor pack for the surgical instrument may be disposed on the track of the insertion arm for surgical instrument. The insertion arm for surgical instrument drives the motor pack for the surgical instrument on which the surgical instrument is mounted to move on the track to perform corresponding surgical operations. It can be seen that the executing device 310 and the driving device 320 are consistent in pitching angle, rolling angle, or yawing angle. Thus, either the executing device 310 or the driving device 320 may be provided with at least one inertial sensor, and the fused data may be obtained by fusing the data collected through detection by the at least one inertial sensor. Alternatively, the executing device 310 and the driving device 320 are each provided with at least one inertial sensor for concurrent detection. In this way, redundancy of the inertial sensors can be achieved, resulting in redundancy of inertial sensing data, thereby ensuring data accuracy and improving the accuracy of the subsequent data fusion.

In some embodiments, when there are a plurality of inertial sensors of each type, the average value or median of the inertial sensor data obtained through the inertial sensors of a same type may be used for the data fusion. For example, for the angular velocity data of the driving device, the average value or median of the angular velocity data of the driving device obtained through the inertial sensors of a same type may be used as the angular velocity data of the driving device for the data fusion. Data obtained through the inertial sensors of other types may be processed similarly.

In some embodiments, working abnormality includes: one or more of the pitching angle, the rolling angle, and the yawing angle are out of synchronization. In some embodiments, the working abnormality may also include: the parallel mechanism including one or more fractured pre-tensioned metal strips or steel belts.

In some embodiments, the method may further include: when it is determined that the robot apparatus is working abnormally, issuing an alarm. In some embodiments, the robotic apparatus may be stopped from working after issuing the alarm. It can be seen that the alarm issued when the robotic apparatus is working abnormally can facilitate users to stop and repair timely.

In some embodiments, the alarm may be in sound and light mode, or may be display, on a display device of the robotic apparatus, of contents indicating non-synchronization of one or more of the pitching angle, rolling angle, and yawing angle, and/or fracture of the metal strips or steel belts in the transmission device.

In some embodiments, determining whether one or more of the actual pitching angle, the actual rolling angle and the actual yawing angle are synchronized with the one or more respective target angles, includes:
    determining whether each of the actual pitching angle, the actual rolling angle or the actual yawing angle falls within a respective preset angle range, where the respective preset angle range includes a respective target angle of the one or more respective target angles; and
    in response to one or more of the actual pitching angle, the actual rolling angle and the actual yawing angle not falling within the respective preset angle range, determining that the actual pitching angle, the actual rolling angle or the actual yawing angle is not synchronized with the one or more respective target angles.

In some embodiments, the preset angle range may be a range centered at the target angle. For example, when the target angle is $A_t$, the preset angle range may be $[A_t-a, A_t+b]$, where a and b may be the same or different, and a and b are positive numbers. It should be understood that each of the pitching angle, the rolling angle, and the yawing angle has a respective target angle.

The values of a and b may be set as needed and are not limited in the present disclosure. For example, the values of a and b may be set considering the transitional bumps caused by the structural flexibility of the transmission device.

In some embodiments, the target angle may be the angle output by the force providing device, for example, one or more of the pitching angle, the rolling angle, and the yawing angle output by the compact motor drive.

In some embodiments, the operation S430 of determining the operation status of the robotic apparatus based on the fused data, further includes:

in response to the actual pitching angle, the actual rolling angle and the actual yawing angle each falling within the respective preset angle range, determining that each of the actual pitching angle, the actual rolling angle and the actual yawing angle is synchronized with a respective target angle.

In some embodiments, the operation S430 of determining the operation status of the robotic apparatus based on the fused data, further includes:

in response to one or more of the actual pitching angle, the actual rolling angle and the actual yawing angle not falling within the respective preset angle range, determining that the actual pitching angle, the actual rolling angle or the actual yawing angle is not synchronized with the one or more respective target angles.

In some embodiments, when each of the actual pitching angle, the actual rolling angle and the actual yawing angle is synchronized with a respective target angle, it is determined that the robotic apparatus is working normally.

In some embodiments, the operation S430 of determining the operation status of the robotic apparatus based on the fused data, and controlling the robotic apparatus in response to the operation status, further includes:

calculating one or more respective synchronization rates for one or more of the actual pitching angle, the actual rolling angle and the actual yawing angle based on one or more of the actual pitching angle, the actual rolling angle and the actual yawing angle and the one or more respective target angles;

determining whether each synchronization rate of the one or more respective synchronization rates for one or more of the actual pitching angle, the actual rolling angle and the actual yawing angle is greater than or equal to a respective synchronization rate threshold; and in response to at least one synchronization rate of the one or more respective synchronization rates for one or more of the actual pitching angle, the actual rolling angle and the actual yawing angle being less than one or more respective synchronization rate thresholds, determining that the robotic apparatus is working abnormally and controlling the robotic apparatus to stop working.

In some embodiments, the operation S430 of determining the operation status of the robotic apparatus based on the fused data, and controlling the robotic apparatus in response to the operation status, further includes:

calculating, based on the one or more respective synchronization rates for one or more of the actual pitching angle, the actual rolling angle and the actual yawing angle, one or more respective changes in the one or more respective synchronization rates for one or more of the actual pitching angle, the actual rolling angle and the actual yawing angle within a first preset time period, and determining whether the one or more respective changes exceed one or more respective change thresholds; and in response to the one or more respective changes in the one or more respective synchronization rates for one or more of the actual pitching angle, the actual rolling angle and the actual yawing angle within the first preset time period exceeding the one or more respective change thresholds, determining that the robotic apparatus is working abnormally and controlling the robotic apparatus to stop working.

The one or more respective synchronization rates for one or more of the actual pitching angle, the actual rolling angle and the actual yawing angle of the driving device or the one or more respective changes in the one or more respective synchronization rates may be used to determine whether the robotic apparatus is working normally. In response to the one or more respective synchronization rates for one or more of the actual pitching angle, the actual rolling angle and the actual yawing angle being less than one or more respective synchronization rate thresholds, or in response to the one or more respective changes in the one or more respective synchronization rates for one or more of the actual pitching angle, the actual rolling angle and the actual yawing angle being excessive (being greater than the one or more respective change thresholds), it is determined that the robotic apparatus is working abnormally, and the robotic apparatus may be controlled to stop working, in order to prevent the robotic apparatus from being damaged.

It can be seen that in the method for controlling the robotic apparatus according to the embodiments of the present disclosure, the rolling angles, the pitching angles, and the yawing angles of the transmission device (such as a parallel mechanism) and the driving device (such as an insertion arm for surgical instrument) are detected concurrently, thereby achieving multi-directional movement detection of the robotic apparatus and increasing the comprehensiveness of angle synchronization monitoring safety system for the surgical robot.

In some embodiments, the operation S420 of performing the data fusion on at least the inertial sensing data to obtain the fused data of the robotic apparatus, includes:

acquiring a control signal of the robotic apparatus; and fusing the inertial sensing data and the control signal to obtain the fused data.

By fusing the control signals of the robotic apparatus with the inertial sensing data detected by the inertial sensor, the obtained fused data contains more comprehensive and accurate information. The state analysis of the robotic apparatus is performed based on the more comprehensive and accurate fused data, in this way, accuracy of the state analysis of the robotic apparatus can be improved, thereby facilitating accurate control of the robotic apparatus.

In some embodiments, the control signal of the robotic apparatus may include: an output signal of the force providing device (i.e. an input signal of the transmission device), such as output angle, output current, output torque or the like; or an output signal of the driving device, such as driving torque output or the like. It should be understood that the control signal may be any signal that controls the devices or components in the robotic apparatus, and is not limited in the present disclosure.

In some embodiments, the robotic apparatus further includes a transmission device connected to the driving device and configured to move the driving device.

The operation S420 of performing the data fusion on at least the inertial sensing data to obtain the fused data of the robotic apparatus, includes:

calculating an output angle of the transmission device based on the inertial sensing data;

calculating, each time, a respective difference between the output angle of the transmission device and an input angle of the transmission device; and estimating a permanent consumption of the transmission device based on a mathematical kinematic model for the transmission device and one or both of a change and a rate of change in neighboring differences.

The operation S430 of determining the operation status of the robotic apparatus based on the fused data, includes:
  determining, based on the permanent consumption, whether the robotic apparatus is working normally, and determining remaining usage time or a remaining usage number of times of the transmission device.

Before the operation of calculating, each time, a respective difference between the output angle of the transmission device and the input angle of the transmission device, the method may further include: acquiring the input angle of the transmission device.

The input angle of the transmission device is the output angle of the power device, and the power device can be controlled by the control device. That is, the control device sends corresponding control commands to the power device to control the output angle of the power device, and the output angle of the power device (i.e. the input angle of the transmission device) can be used as the control signal.

In some embodiments, the operation of determining, based on the permanent consumption, whether the robotic apparatus is working normally, and determining remaining usage time or a remaining usage number of times of the transmission device, includes:
  when the permanent consumption exceeds a preset consumption, determining that the robotic apparatus is working abnormally, and the remaining usage time of the transmission device is 0.

In some embodiments, when it is determined that the robotic apparatus is working abnormally, the robotic apparatus is controlled to stop working.

In some embodiments, the operation of determining, based on the permanent consumption, whether the robotic apparatus is working normally, and determining remaining usage time or a remaining usage number of times of the transmission device, includes:
  when the permanent consumption does not exceed the preset consumption, determining that the robotic apparatus is working normally, and the remaining usage time or the remaining usage number of times of the transmission device is obtained by dividing the difference between the permanent consumption and the preset consumption by an average consumption.

In some embodiments, the average consumption may be calculated based on the permanent consumption and the usage time or the usage number of times corresponding to the permanent consumption. For example, average consumption may be obtained by dividing permanent consumption by corresponding usage time, or average consumption may be obtained by dividing permanent consumption by corresponding usage number of times.

In some embodiments, the preset consumption may be the consumption corresponding to the time point at which pre-tensioning or replacement is required. When the preset consumption indicates the time point at which pre-tensioning is required, the calculated remaining usage time or remaining usage number of times of the transmission device indicates the remaining usage time or remaining usage number of times before the next pre-tensioning of the transmission device. When the preset consumption indicates the time point at which replacement is required, the calculated remaining usage time or remaining usage number of times of the transmission device indicates the remaining usage time or remaining usage number of times before replacement of the transmission device. It should be understood that the preset consumption may be set as needed, and is not limited in the present disclosure.

In some embodiments, the input angle of the transmission device may be the output angle of the force providing device, for example, the pitching angle, rolling angle, and yawing angle output by the compact motor drive.

The transmission device may be a parallel mechanism, and a mathematical kinematic model for the transmission device may be the mathematical kinematic model for the parallel mechanism. The permanent consumption of the transmission device may be estimated based on the mathematical kinematic model for the transmission device and one or both of a change and a rate of change in neighboring differences between the respective inputs and the respective outputs of the transmission device, in order to obtain the remaining usage time of the transmission device. The permanent consumption may refer to the unrecoverable consumption in the transmission device. Taking a transmission strip in the transmission device as an example, the permanent consumption refers to the unrecoverable elongation of the transmission strip, and the remaining usage number of times or the remaining usage time of the transmission strip may be estimated based on the elongation of the transmission strip in each use of the transmission device.

In some embodiments, the method 400 for controlling the robotic apparatus may further include:
  reporting, by an output device of the robotic apparatus, one or more of the permanent consumption, remaining usage time, and remaining usage number of times of the transmission device.

In some embodiments, the method 400 for controlling the robotic apparatus may further include:
  determining the time point at which maintenance of the transmission device is required based on one or both of the remaining usage time and the remaining usage number of times of the transmission device.

In some embodiments, the method 400 for controlling the robotic apparatus may further include:
  reporting, by the output device of the robotic apparatus, a maintenance duration for the transmission device.

It can be seen that by estimating one or more of the permanent consumption, the remaining usage time, and the remaining usage number of times of the transmission device, maintenance work can be reasonably arranged, thereby reducing maintenance times and costs, and improving maintenance efficiency.

In some embodiments, the inertial sensing data includes acceleration data.

The operation S420 of performing the data fusion on at least the inertial sensing data, includes:
  acquiring actual current data of the force providing device; and
  estimating theoretical acceleration data of the transmission device based on the actual current data and a mathematical kinematic model for the transmission device.

The operation S430 of determining the operation status of the robotic apparatus based on the fused data, and controlling the robotic apparatus in response to the operation status, includes:
  determining whether a collision occurs on the robotic apparatus based on the theoretical acceleration data and the acceleration data; and
  in response to determining that a collision occurs on the robotic apparatus, controlling the robotic apparatus to stop working.

In some embodiments, the operation of determining whether a collision occurs on the robotic apparatus based on the theoretical acceleration data and the acceleration data, may include:
when the theoretical acceleration data is greater than or equal to the acceleration data, determining that a collision occurs on the robotic apparatus; and
when the theoretical acceleration data is less than the acceleration data, determining that no collision occurs on the robotic apparatus.

The force providing device may be disposed at a joint of the robotic arm of the surgical robot, and the transmission device may be the robotic arm. The acceleration data collected through detection by the inertial sensor may be compared with the theoretical acceleration output by the transmission device. When a collision occurs, the force providing device connected to the transmission device increases its input current to maintain the moving speed. Thus, the theoretical acceleration data obtained based on the detected input current and the mathematical kinematic model for the transmission device will increase, while the actual acceleration data detected by the inertial sensor will decrease due to the collision. Therefore, when the collision occurs, the theoretical acceleration data will be greater than the detected acceleration data. Based on this, it is possible to actively detect whether there is a collision between the transmission device (for example a robotic arm) and surrounding objects, the collision mainly includes a collision between robotic arms and a collision between the robotic arm and external environment. In this way, the safety of the robotic apparatus can be improved.

In some embodiments, the method 400 may further include: prompting the user when a collision is detected. For example, a specific sound or voice prompt may be issued, or an occurred collision may be indicated using the output device of the robotic apparatus, for example, a prompt message may be displayed on the display device of the robotic apparatus.

In some embodiments, the method 400 may further include: stopping the robotic arm on which the collision occurs after detecting the collision. In this way, it is convenient for users to remove obstacles.

In some embodiments, the operation S420 of performing the data fusion on at least the inertial sensing data, includes:
calculating deformation data of the transmission device based on the inertial sensing data; and
calculating magnitude and a direction of a force applied by a user on the driving device based on the deformation data.

The operation S430 of determining the operation status of the robotic apparatus based on the fused data, and controlling the robotic apparatus in response to the operation status, includes:
controlling at least one angle of the adjusting device based on the magnitude and the direction of the force.

Referring to FIG. 3, after the surgical instrument is installed on the robotic apparatus, the transmission device 350 (such as a parallel mechanism) and the force providing device 360 (such as a compact motor drive) will be in an angle-maintaining state. When a user (such as a medical staff) manually moves the executing device 310 (such as an insertion arm for surgical instrument) thereby causing deformation of the transmission device 350 (such as a parallel mechanism), the deformation degree of the transmission device 350 (such as a parallel mechanism) detected in real-time by the at least one inertial sensor 330 may be used to estimate the magnitude and direction of the force applied by the user. The control device then acquires the torque and speed output required by each joint of the adjusting device 370 (such as the set-up joint) disposed at the rear end of the robotic apparatus using the inverse kinematics algorithm, and sends corresponding commands to the set-up joint to achieve the angle control of the set-up joint, so that the user can easily move the set-up joint.

Figure 5:
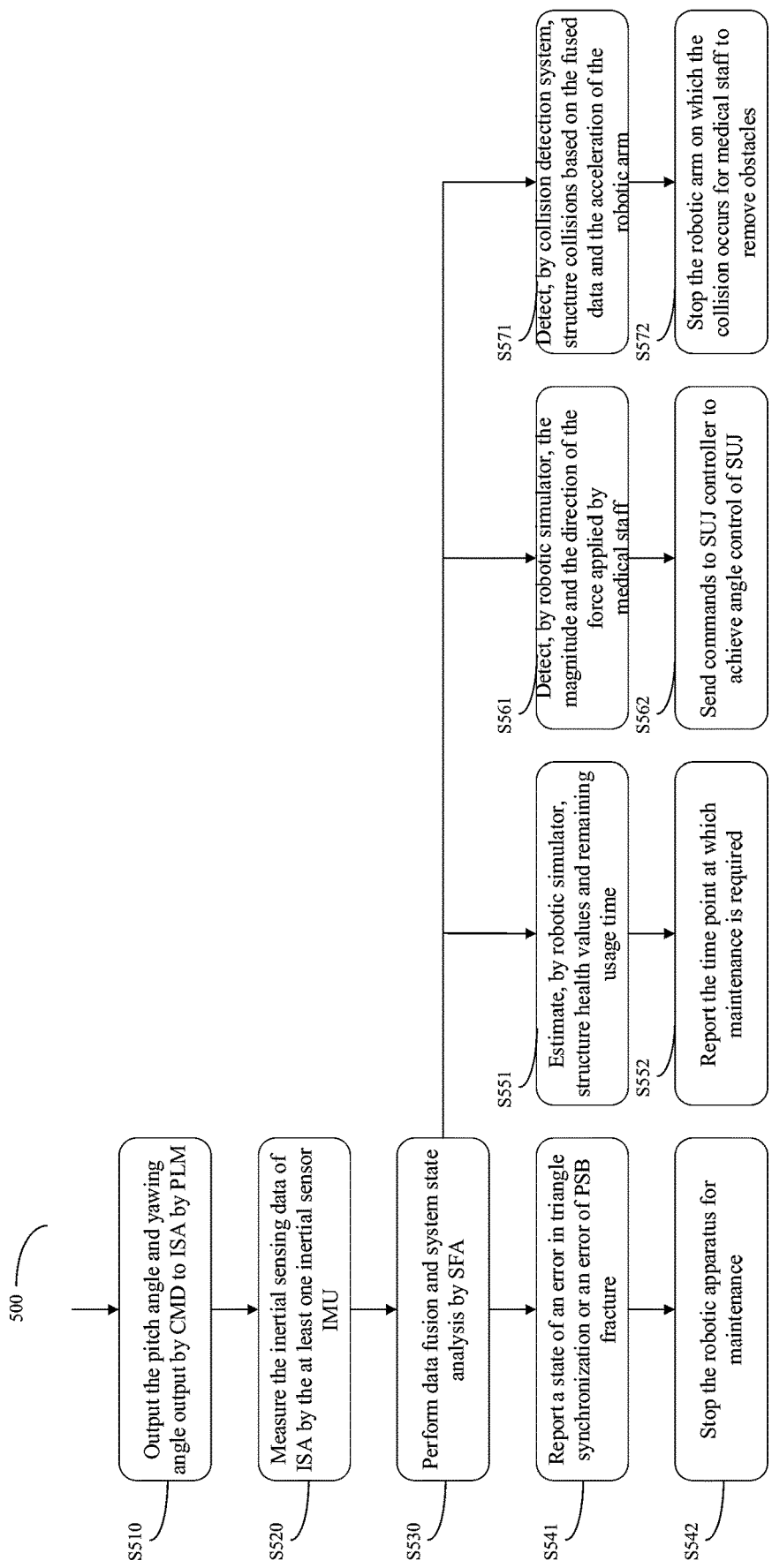
FIG. 5 is an example of the method for controlling the robotic apparatus according to some embodiments of the present disclosure.

Referring to FIG. 5, FIG. 5 shows an example of the method for controlling the robotic apparatus according to some embodiments of the present disclosure. As shown in FIG. 5, the control method 500 for the robotic apparatus includes the following operations.

At S510, the pitch angle and yawing angle output by the force providing device (such as the compact motor drive) are transmitted to the driving device (such as the insertion arm for surgical instrument) by the transmission device (such as the parallel mechanism) and the pre-tensioned metal strips installed inside the transmission device.

At S520, acceleration data, angular velocity data, and direction data of the driving device are generated with detection by the at least one inertial sensor (also known as inertial measurement unit, IMU) disposed on the driving device to obtain the actual pitching angle, actual rolling angle, and actual yawing angle of the driving device.

At S530, data fusion is performed on the data detected by the sensor and the control signal using data fusion algorithms, and the operation status of the robotic apparatus is analyzed.

At S541, it is determined whether one or more of the actual pitching angle, the actual rolling angle, and the actual yawing angle are synchronized with the one or more respective target angles; and when one or more of the actual pitching angle, the actual rolling angle, and the actual yawing angle are out of synchronization, it is determined that the robotic apparatus is working abnormally and an alarm is triggered.

At S542, the robotic apparatus is stopped for maintenance.

At S551, the permanent consumption and/or the remaining usage time of the transmission device is estimated based on the mathematical model for the transmission device and a difference between the input and the output of the transmission device; and a time point at which maintenance of the transmission device is required is determined according to the permanent consumption and/or the remaining usage time of the transmission device.

At S552, the time point at which maintenance of the transmission device is required is reported using the output device of the robotic apparatus.

At S561, the magnitude and the direction of the force applied by the user is estimated based on the deformation degree of the transmission device (such as a parallel mechanism) calculated based on the inertial sensing data detected by the at least one inertial sensor in real time.

At S562, corresponding commands are sent to the set-up joint based on the magnitude and the direction of the force to achieve angle control of the set-up joint.

At S571, it is determined whether a collision with surrounding objects occurs on the transmission device based on the fused data and the acceleration data.

At S572, when detecting the collision, the robotic arm on which the collision occurs is stopped for medical staff to remove obstacles.

The robotic apparatus and control method thereof according to embodiments of the present disclosure use at least one inertial sensor to detect inertial sensing data and perform data fusion and analysis. In this way, precision of the detection performed on the robotic apparatus can be improved, thereby improving the reliability of the robotic apparatus. Moreover, a plurality of sets of encoders can be eliminated, thereby greatly simplifying the structure of the robotic apparatus, reducing weight and volume of the robotic apparatus, and reducing costs.

Those skilled in the art can realize that the units and algorithm operations in each example described in the disclosed embodiments herein may be implemented in electronic hardware, or a combination of computer software and electronic hardware. Whether these functions are implemented in hardware or software depends on the specific application and design constraints of the technical solutions. Those skilled in the art may use different methods to achieve the described functions for each specific application, but such implementation should not be considered beyond the scope of the present disclosure.

In the embodiments provided the present disclosure, it should be understood that the disclosed apparatus and methods may be implemented in other ways. For example, the apparatus embodiments described above are only exemplary. For example, the division of the units is only a logical functional division, and there may be other division methods in actual implementation. For example, a plurality of units or components may be combined or integrated into another device, or some features may be omitted or not executed.

In the description, a large number of specific details are provided. However, it should be understood that embodiments of the present disclosure may be implemented without these specific details. In some examples, well-known methods, structures, and techniques are not shown in detail to avoid blurring the understanding of the description.

Similarly, it should be understood that in order to streamline the present disclosure and assist in understanding one or more of the various aspects of the present disclosure, in the description of exemplary embodiments of the present disclosure, the various features of the present disclosure are sometimes grouped together into a single embodiment, diagram, or description thereof. However, the method according to the present disclosure should not be interpreted as reflecting the intention that the claimed present disclosure requires more features than those explicitly recited in each claim. More precisely, as reflected in the corresponding claims, the inventive point is that the corresponding technical problem can be solved with less than all features of a single disclosed embodiment. Therefore, the claims following the specific embodiments are explicitly incorporated into the specific embodiments, where each claim itself serves as an individual embodiment of the present disclosure.

Those skilled in the art can understand that unless the features are mutually exclusive, any combination may be used to combine all the features and all processes or units of any method or device disclosed in the description (including accompanying claims, abstracts, and drawings). Unless otherwise explicitly stated, each feature disclosed in the description (including accompanying claims, abstracts, and drawings) may be replaced by alternative features that provide the same, equivalent, or similar purpose.

In addition, those skilled in the art should understand that although some embodiments described herein include some features included in other embodiments rather than other features, the combination of features of different embodiments means being within the scope of the present disclosure and forming different embodiments. For example, in the claims, any one of the claimed embodiments may be used in any combination.

It should be noted that the above embodiments illustrate the present disclosure rather than limit it, and those skilled in the art can design alternative embodiments without departing from the scope of the accompanying claims. In the claims, any reference numeral in parentheses should not be constructed as a restriction on the claims. The expression "including" does not exclude the presence of components or operations not listed in the claims. The expression "a" or "an" before a component does not exclude the existence of a plurality of such components. The present disclosure may be implemented with the help of hardware including several different components and with the help of appropriately programmed computers. Among the unit claims that list several devices, several of these devices may be specifically embodied through a same hardware item. The use of expressions first, second, and third does not indicate any order. These expressions may be interpreted as names.

The above are only embodiments or description of the embodiments of the present disclosure. The scope of protection of the present disclosure is not limited to this. Any skilled person familiar with the technical field can easily think of changes or replacements within the scope of the technology disclosed in the present disclosure, these changes or replacements should be included in the scope of protection of the present disclosure. The scope of protection of the present disclosure shall be in line with the scope of protection of the claims.

The invention claimed is:

1. A method for controlling a robotic apparatus, wherein the robotic apparatus comprises an executing device on which an executing instrument is mounted and a driving device configured to drive the executing device to move on the driving device, and wherein the method comprises:
   acquiring inertial sensing data from at least one inertial sensor disposed on one or both of the executing device and the driving device;
   performing data fusion on at least the inertial sensing data to obtain fused data of the robotic apparatus; and
   determining an operation status of the robotic apparatus based on the fused data, and controlling the robotic apparatus in response to the operation status,
   wherein the robotic apparatus further comprises a transmission device mechanically connected to the driving device and configured to move the driving device;
   wherein performing the data fusion on at least the inertial sensing data to obtain the fused data of the robotic apparatus, comprises:
   acquiring a control signal of the robotic apparatus;
   fusing the inertial sensing data and the control signal to obtain the fused data;
   calculating an output angle of the transmission device based on the inertial sensing data;
   calculating, each time, a respective difference between the output angle of the transmission device and an input angle of the transmission device; and
   estimating an unrecoverable consumption in the transmission device based on a mathematical kinematic model for the transmission device and one or both of a change and a rate of change in neighboring differences, the unrecoverable consumption indicating unrecoverable degradation of the transmission device; and
   wherein determining the operation status of the robotic apparatus based on the fused data, comprises:
   determining whether the unrecoverable consumption exceeds a preset consumption, and determining remaining usage time or a remaining usage number of times of the transmission device based on the unrecoverable consumption.

2. The method according to claim 1, wherein performing the data fusion on the inertial sensing data, further comprises:
calculating one or more of an actual pitching angle, an actual rolling angle and an actual yawing angle of the driving device based on at least the inertial sensing data; and
wherein determining the operation status of the robotic apparatus based on the fused data, and controlling the robotic apparatus in response to the operation status, comprises:
in response to one or more of the actual pitching angle, the actual rolling angle and the actual yawing angle being not synchronized with one or more respective target angles, determining that the robotic apparatus is working abnormally; and
in response to the robotic apparatus being working abnormally, controlling the robotic apparatus to stop working.

3. The method according to claim 2, wherein before determining that the robotic apparatus is working abnormally, determining the operation status of the robotic apparatus based on the fused data, and controlling the robotic apparatus in response to the operation status, further comprises:
determining whether each of the actual pitching angle, the actual rolling angle and the actual yawing angle falls within a respective preset angle range, wherein the respective preset angle range comprises a respective target angle of the one or more respective target angles; and
in response to one or more of the actual pitching angle, the actual rolling angle and the actual yawing angle not falling within the respective preset angle range, determining that one or more of the actual pitching angle, the actual rolling angle and the actual yawing angle are not synchronized with the one or more respective target angles.

4. The method according to claim 1, wherein determining the operation status of the robotic apparatus based on the fused data, and controlling the robotic apparatus according to the operation status, comprises:
calculating one or more respective synchronization rates for one or more of an actual pitching angle, an actual rolling angle and an actual yawing angle based on one or more of the actual pitching angle, the actual rolling angle and the actual yawing angle and one or more respective target angles;
determining whether each synchronization rate of the one or more respective synchronization rates for one or more of the actual pitching angle, the actual rolling angle and the actual yawing angle is greater than or equal to a respective synchronization rate threshold; and
in response to at least one synchronization rate of the one or more respective synchronization rates for one or more of the actual pitching angle, the actual rolling angle and the actual yawing angle being less than one or more respective synchronization rate thresholds, determining that the robotic apparatus is working abnormally and controlling the robotic apparatus to stop working.

5. The method according to claim 4, wherein determining the operation status of the robotic apparatus based on the fused data, and controlling the robotic apparatus in response to the operation status, further comprises:
calculating, based on the one or more respective synchronization rates for one or more of the actual pitching angle, the actual rolling angle and the actual yawing angle, one or more respective changes in the one or more respective synchronization rates for one or more of the actual pitching angle, the actual rolling angle and the actual yawing angle within a first preset time period; and
in response to the one or more respective changes within the first preset time period exceeding one or more respective change thresholds, determining that the robotic apparatus is working abnormally and controlling the robotic apparatus to stop working.

6. The method according to claim 1, comprising:
using a complementary algorithm, an algorithm based on noise models, or an algorithm based on particle swarm optimization to perform the data fusion on at least the inertial sensing data to obtain the fused data of the robotic apparatus.

7. The method according to claim 1, wherein the inertial sensing data comprises one or more of acceleration data, angular velocity data, and direction data.

8. A robotic apparatus, comprising:
an executing device, on which an executing instrument is mounted;
a driving device, mechanically connected to the executing device and configured to drive the executing device to move on the driving device;
at least one processor; and
a memory being communicatively coupled to the at least one processor;
wherein the memory is configured to store instructions, which, when executed by the at least one processor, cause the at least one processor to implement operations of the method of claim 1.

9. The robotic apparatus according to claim 8, wherein performing the data fusion on the inertial sensing data, further comprises:
calculating one or more of an actual pitching angle, an actual rolling angle and an actual yawing angle of the driving device based on at least the inertial sensing data; and
wherein determining the operation status of the robotic apparatus based on the fused data, and controlling the robotic apparatus in response to the operation status, comprises:
in response to one or more of the actual pitching angle, the actual rolling angle and the actual yawing angle being not synchronized with one or more respective target angles, determining that the robotic apparatus is working abnormally; and
in response to the robotic apparatus being working abnormally, controlling the robotic apparatus to stop working.

10. The robotic apparatus according to claim 9, wherein before determining that the robotic apparatus is working abnormally, determining the operation status of the robotic apparatus based on the fused data, and controlling the robotic apparatus in response to the operation status, further comprises:
determining whether each of the actual pitching angle, the actual rolling angle and the actual yawing angle falls within a respective preset angle range, wherein the respective preset angle range comprises a respective target angle of the one or more respective target angles; and in response to one or more of the actual pitching angle, the actual rolling angle and the actual yawing angle not falling within the respective preset angle range, determining that one or more of the actual pitching angle, the actual rolling angle and the actual yawing angle are not synchronized with the one or more respective target angles.

11. The robotic apparatus according to claim 8, wherein determining the operation status of the robotic apparatus based on the fused data, and controlling the robotic apparatus according to the operation status, comprises:

calculating one or more respective synchronization rates for one or more of an actual pitching angle, an actual rolling angle and an actual yawing angle based on one or more of the actual pitching angle, the actual rolling angle and the actual yawing angle and one or more respective target angles;

determining whether each synchronization rate of the one or more respective synchronization rates for one or more of the actual pitching angle, the actual rolling angle and the actual yawing angle is greater than or equal to a respective synchronization rate threshold; and in response to at least one synchronization rate of the one or more respective synchronization rates for one or more of the actual pitching angle, the actual rolling angle and the actual yawing angle being less than one or more respective synchronization rate thresholds, determining that the robotic apparatus is working abnormally and controlling the robotic apparatus to stop working.

12. The robotic apparatus according to claim 11, wherein determining the operation status of the robotic apparatus based on the fused data, and controlling the robotic apparatus in response to the operation status, further comprises:

calculating, based on the one or more respective synchronization rates for one or more of the actual pitching angle, the actual rolling angle and the actual yawing angle, one or more respective changes in the one or more respective synchronization rates for one or more of the actual pitching angle, the actual rolling angle and the actual yawing angle within a first preset time period; and in response to the one or more respective changes within the first preset time period exceeding one or more respective change thresholds, determining that the robotic apparatus is working abnormally and controlling the robotic apparatus to stop working.

13. A control device, comprising:
at least one processor; and
a memory being in communication connection with the at least one processor;
wherein the memory is configured to store instructions, which, when executed by the at least one processor, causes the at least one processor to implement operations of the method of claim 1.

14. The method according to claim 1, wherein the transmission device comprises a transmission strip, and the unrecoverable consumption refers to unrecoverable elongation of the transmission strip.

15. A method for controlling a robotic apparatus, wherein the robotic apparatus comprises an executing device on which an executing instrument is mounted and a driving device configured to drive the executing device to move on the driving device, and wherein the method comprises:

acquiring inertial sensing data from at least one inertial sensor disposed on one or both of the executing device and the driving device;

performing data fusion on at least the inertial sensing data to obtain fused data of the robotic apparatus; and determining an operation status of the robotic apparatus based on the fused data, and controlling the robotic apparatus in response to the operation status;

wherein the robotic apparatus further comprises a transmission device mechanically connected to the driving device and configured to move the driving device, and a force providing device mechanically connected to the transmission device and configured to provide a driving force to the transmission device, and the inertial sensing data comprises acceleration data;

wherein performing the data fusion on at least the inertial sensing data, comprises:

acquiring a control signal of the robotic apparatus;

fusing the inertial sensing data and the control signal to obtain the fused data;

acquiring actual input current data of the force providing device; and estimating theoretical acceleration data of the transmission device based on the actual input current data and a mathematical kinematic model for the transmission device; and wherein determining the operation status of the robotic apparatus based on the fused data, and controlling the robotic apparatus in response to the operation status, comprises:

determining whether a collision occurs on the robotic apparatus based on the theoretical acceleration data and the acceleration data; and in response to determining that a collision occurs on the robotic apparatus, controlling the robotic apparatus to stop working.

16. The method according to claim 15, wherein the control signal comprises one or more of an output signal of the force providing device, an input signal of the transmission device, and an output signal of the driving device.

17. A robotic apparatus, comprising:
an executing device, on which an executing instrument is mounted;
a driving device mechanically connected to the executing device and configured to drive the executing device to move on the driving device;
a transmission device mechanically connected to the driving device and configured to move the driving device;
a force providing device mechanically connected to the transmission device and configured to provide a driving force to the transmission device;
at least one processor; and
a memory being communicatively coupled to the at least one processor;
wherein the memory is configured to store instructions, which, when executed by the at least one processor, cause the at least one processor to implement operations of the method of claim 7.

18. A method for controlling a robotic apparatus, wherein the robotic apparatus comprises an executing device on which an executing instrument is mounted and a driving device configured to drive the executing device to move on the driving device, and wherein the method comprises:

acquiring inertial sensing data from at least one inertial sensor disposed on one or both of the executing device and the driving device;

performing data fusion on at least the inertial sensing data to obtain fused data of the robotic apparatus; and determining an operation status of the robotic apparatus based on the fused data, and controlling the robotic apparatus in response to the operation status;

wherein the robotic apparatus further comprises: a transmission device mechanically connected to the driving device and configured to move the driving device, a force providing device mechanically connected to the transmission device and configured to provide a driving force to the transmission device, and an adjusting device mechanically connected to the force providing device and configured to adjust one or more of a position and an orientation of the force providing device;

wherein performing the data fusion on at least the inertial sensing data, comprises:

acquiring a control signal of the robotic apparatus;

fusing the inertial sensing data and the control signal to obtain the fused data;

calculating deformation data of the transmission device based on the inertial sensing data, the deformation data indicating a deformation degree of the transmission device initiated by a user; and calculating magnitude and a direction of a force applied by a user on the driving device based on the deformation data; and wherein determining the operation status of the robotic apparatus based on the fused data, and controlling the robotic apparatus in response to the operation status, comprises:

controlling at least one angle of the adjusting device based on the magnitude and the direction of the force.

19. A robotic apparatus, comprising:

an executing device, on which an executing instrument is mounted;

a driving device mechanically connected to the executing device and configured to drive the executing device to move on the driving device;

a transmission device mechanically connected to the driving device and configured to move the driving device;

a force providing device mechanically connected to the transmission device and configured to provide a driving force to the transmission device;

an adjusting device mechanically connected to the force providing device and configured to adjust one or more of a position and an orientation of the force providing device;

at least one processor; and a memory being communicatively coupled to the at least one processor;

wherein the memory is configured to store instructions, which, when executed by the at least one processor, cause the at least one processor to implement operations of the method of claim 8.

20. The method according to claim 18, wherein the determining the operation status of the robotic apparatus based on the fused data, and controlling the robotic apparatus in response to the operation status comprises:

acquiring a torque and a speed output required by each joint of the adjusting device basing on the magnitude and the direction of the force applied by the user on the driving device using an inverse kinematics algorithm; and transmitting a command to provide the torque and the speed output to the adjusting device to control an angle of the adjusting device so as to facilitate a user in moving the adjusting device.

* * * * *